United States Patent [19]
Zur et al.

[11] Patent Number: 5,508,511
[45] Date of Patent: Apr. 16, 1996

[54] ARRANGEMENT FOR AND METHOD OF DETECTING AN OBJECT IN AN AREA SUBJECT TO ENVIRONMENTAL VARIATIONS

[75] Inventors: Oded Y. Zur, Los Angeles; John A. Shaw, Long Beach; Asaf Gurner, Los Angeles; Reza Miremadi, Agoura, all of Calif.

[73] Assignee: Interactive Light, Inc., Santa Monica, Calif.

[21] Appl. No.: 248,434

[22] Filed: May 24, 1994

[51] Int. Cl.⁶ .............................. G01J 1/32; H01J 40/14
[52] U.S. Cl. .................. 250/222.1; 250/214 B; 49/26; 340/555
[58] Field of Search .................... 250/214 B, 222.1, 250/221; 49/26–28; 340/555–557

[56] References Cited

U.S. PATENT DOCUMENTS

| | | | |
|---|---|---|---|
| 2,419,459 | 2/1944 | McDowell et al. | 250/221 |
| 3,612,884 | 10/1971 | Linardos | 250/214 B |
| 3,970,846 | 7/1976 | Schofield, Jr. et al. | 250/221 |
| 4,128,760 | 12/1978 | Del Signore, II | 250/214 B |
| 4,224,608 | 9/1980 | Lederer | 356/556 |
| 4,545,246 | 10/1985 | Bechtel | 250/221 |
| 4,736,097 | 4/1988 | Phillipp | 250/221 |
| 4,851,689 | 7/1989 | Hasegawa | 250/214 B |
| 4,897,538 | 1/1990 | Lemaire et al. | 250/214 B |
| 5,004,908 | 4/1991 | Nakamura | 250/221 |
| 5,079,417 | 1/1992 | Strand | 250/221 |
| 5,095,203 | 3/1992 | Sato et al. | 250/222.1 |
| 5,164,707 | 11/1992 | Rasmussen et al. | 340/572 |
| 5,173,750 | 12/1992 | Laukaitis | 356/445 |
| 5,191,268 | 3/1993 | Duhame | 49/26 |
| 5,243,181 | 9/1993 | Bondarev et al. | 250/214 B |
| 5,286,967 | 2/1994 | Bates | 250/205 |
| 5,428,923 | 7/1995 | Waggamon | 250/222.1 |

*Primary Examiner*—Stephone B. Allen
*Attorney, Agent, or Firm*—Kirschstein et al.

[57] ABSTRACT

Environmental variations in ambient light and temperature are eliminated in arrangements for and methods of detecting objects in areas exposed to such variations by generating a differential measurement value indicative of the difference between two signals derived from two light sources, both signals being affected in the same way and extent by the environmental variations.

43 Claims, 14 Drawing Sheets

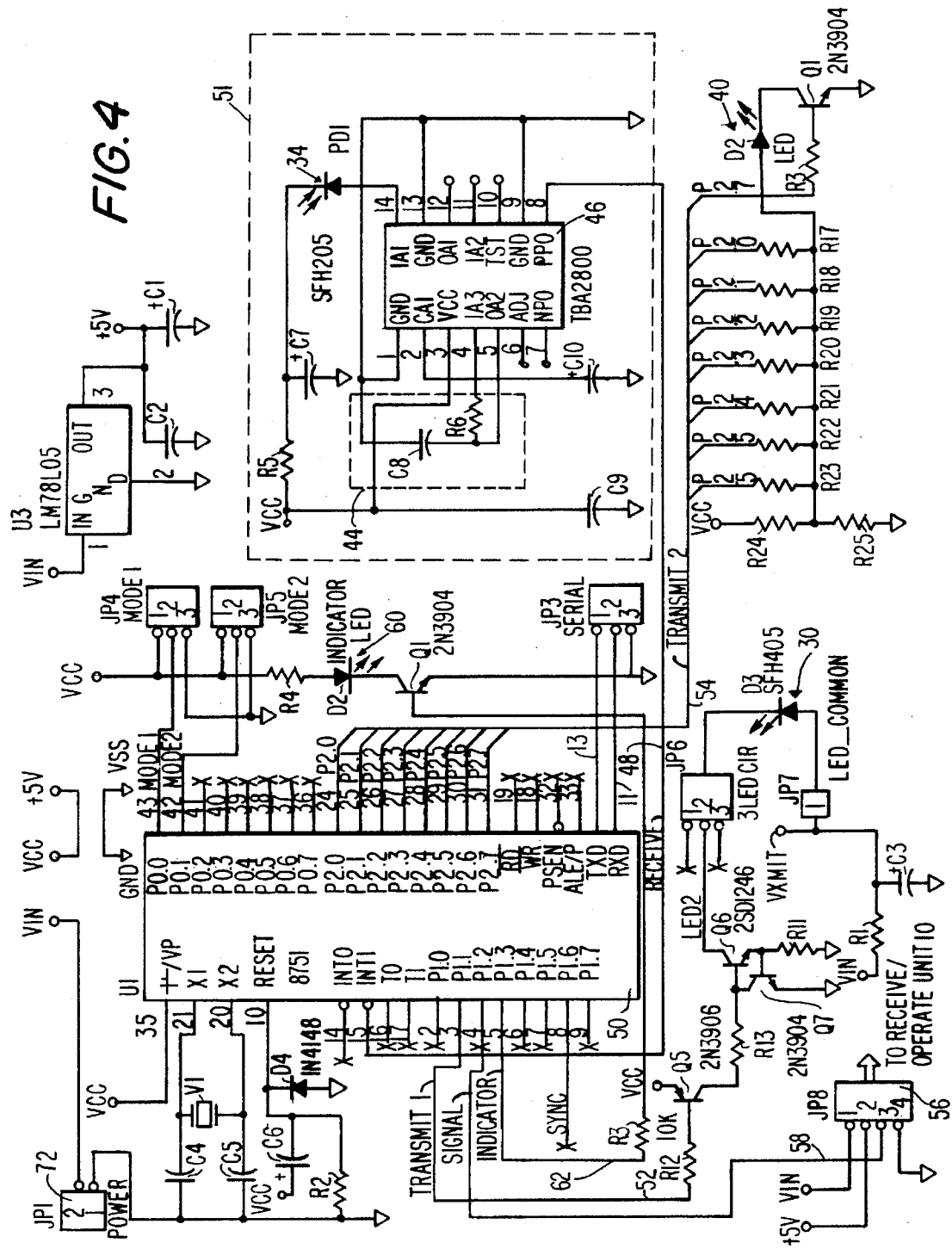

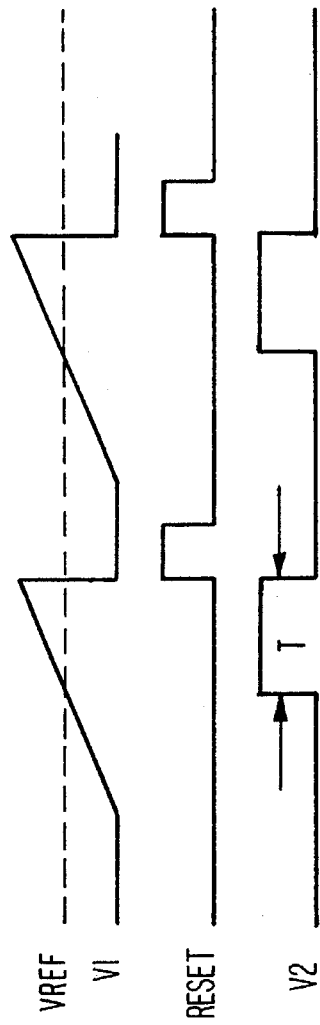
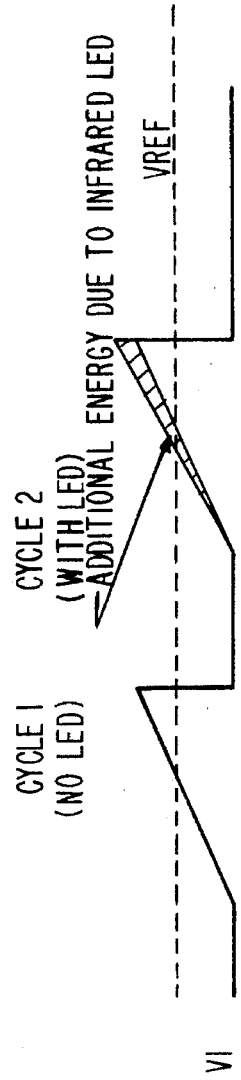
FIG.11a
FIG.11b
FIG.11c
FIG.12a
FIG.12b

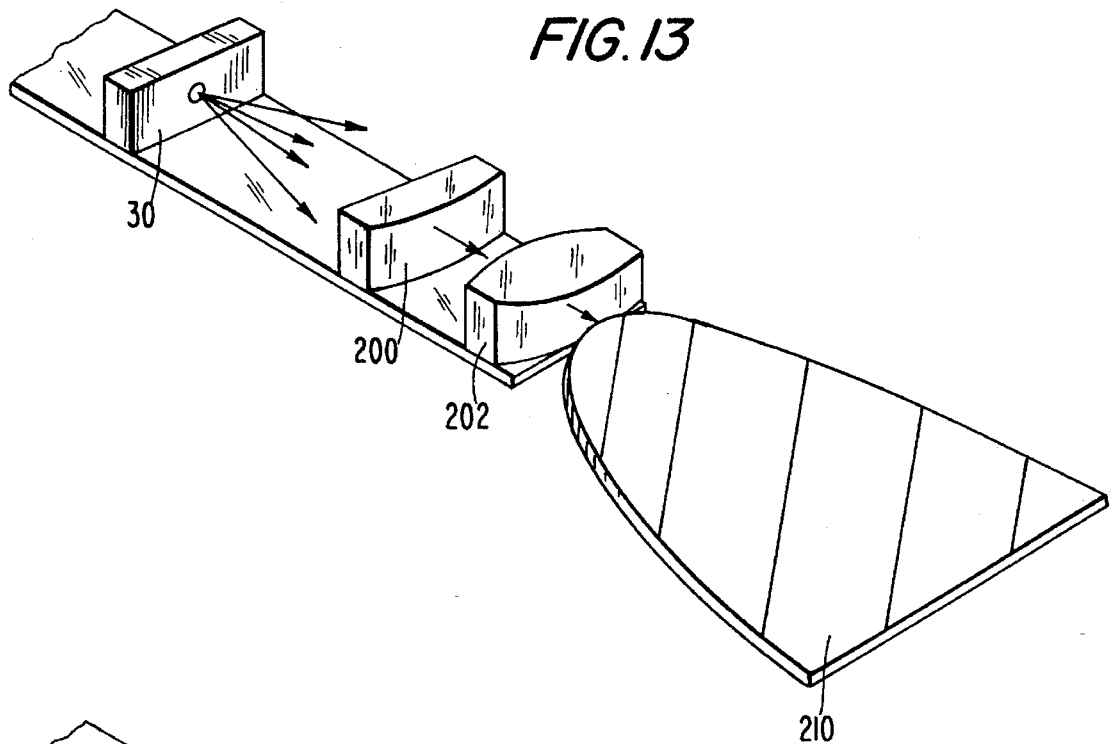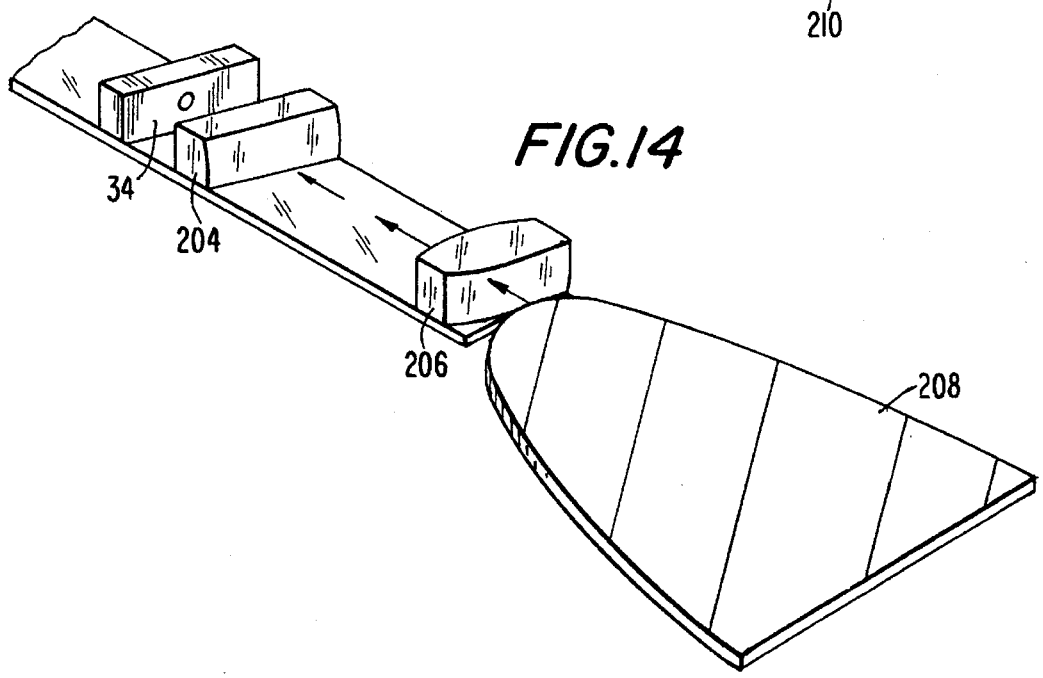

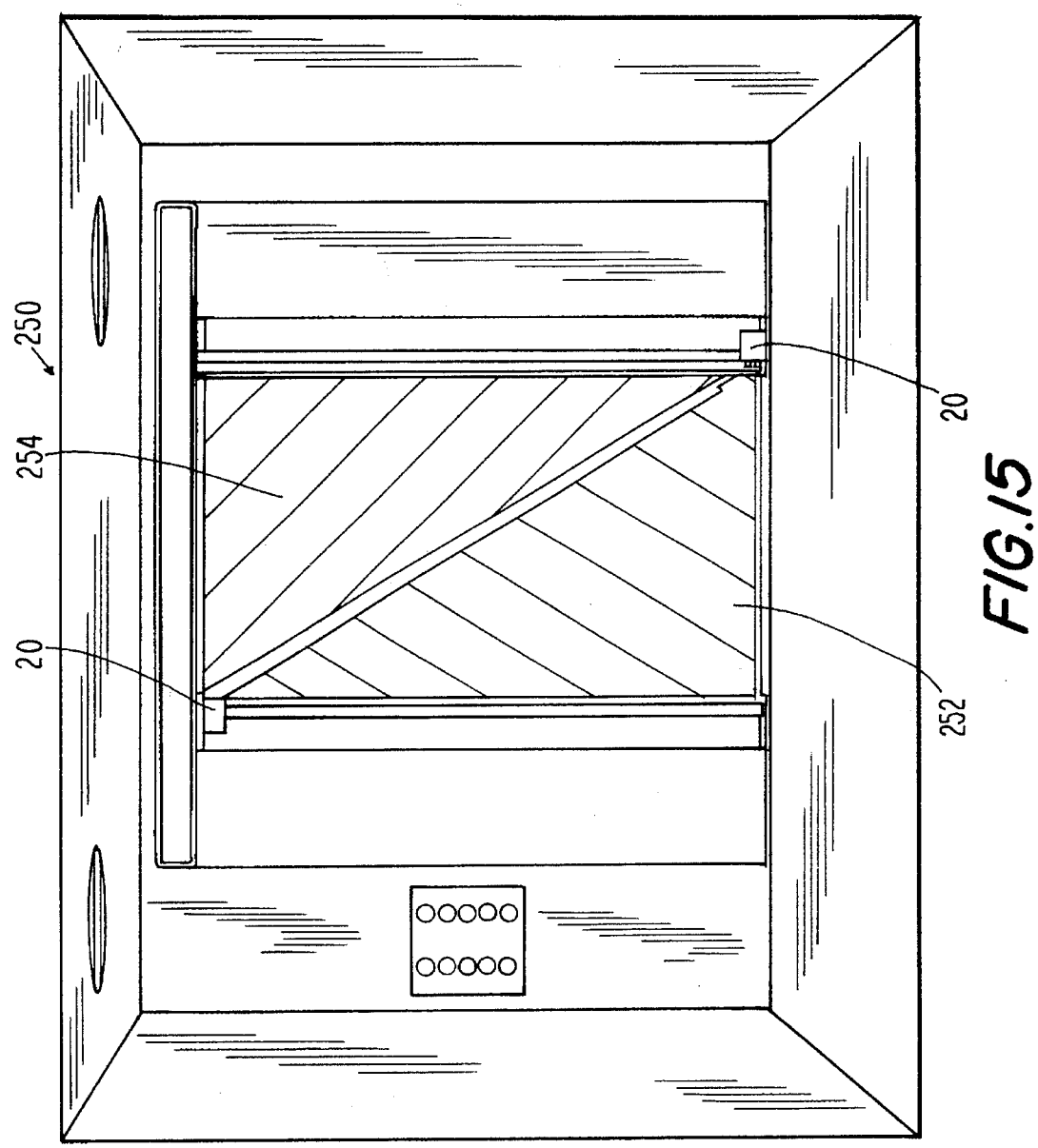

ARRANGEMENT FOR AND METHOD OF DETECTING AN OBJECT IN AN AREA SUBJECT TO ENVIRONMENTAL VARIATIONS

BACKGROUND OF THE INVENTION

1. Field of the Invention

This invention generally relates to an arrangement for, and a method of, detecting the presence or absence of persons or things in an area, such as an entranceway, window or security zone, both outdoor and indoor, despite such environmental variations as ambient light and temperature fluctuations and, more particularly, to fail-safe obstruction detectors especially useful in systems for controlling garage doors, elevator doors and the like, and to security systems for controlling access to a secure area.

2. Description of the Related Art

An obstruction detector for an automatic garage or elevator door control system prevents personal injury and/or property damage to a person or thing caught in the closing door, as well as preventing damage to the door itself and the various drive components that close the door. It has been proposed to use a light transmitter to transmit a light beam, either along a direct or a folded path, across a door opening for detection by a light receiver. Unobstructed receipt of the light beam indicates that the entranceway is free of the object. However, failure to receive the light beam indicates that the entranceway has an obstruction. This failure is electronically processed by a drive controller to either stop or reverse a closing door.

Analogously, it is known in security systems to transmit a light beam across a window or security zone. Interruption of the beam triggers an alarm, thereby summoning law enforcement personnel.

Although the known obstruction detectors and security systems are generally satisfactory for their intended purpose, experience has shown that environmental variations can adversely affect system operation. For example, in garage door applications, ambient light varies and, in some cases, widely, depending, for example, on the level of sunlight, passing clouds, weather conditions, the presence of headlights from passing vehicles, the activation of outdoor and/or indoor garage lights, etc. The receiver is not only exposed to the transmitted light beam, but is also exposed to such ambient light which, in some cases, at least for a limited time, has a level of intensity sufficient to "blind" the receiver and "confuse" the drive controller. Similar considerations apply for the ambient temperature fluctuations, wherein the receiver responds differently and in a non-linear manner at different temperature levels.

Also, some known obstruction detectors, especially in garage and elevator door control systems, are defeated by insuring that the light beam path would not be interrupted by a person entering the entranceway. For example, a reflector could be closely positioned adjacent the light transmitter and receiver. Whether intentional or not, such easily defeated systems do not serve their originally intended function.

SUMMARY OF THE INVENTION

OBJECTS OF THE INVENTION

It is a general object of this invention to advance the state of the art of object detecting arrangements.

Another object of this invention is to provide an arrangement that reliably detects objects, such as persons and/or things, in an area, such as an entranceway, despite such environmental variations as fluctuations in ambient light and temperature.

Still another object of this invention is to provide a self-calibrating arrangement that adjusts itself to variable environmental conditions.

Yet another object of this invention is to provide an obstruction detector arrangement particularly well suited for use in automatic door control systems, such as garage doors and elevator doors.

An additional object of this invention is to provide such an arrangement that assists an installer in installing the arrangement at a given site.

Yet another object of this invention is to provide a fail-safe arrangement which prevents being compromised.

Another object of this invention is to provide a novel method of installing, calibrating and operating such an arrangement.

Still another object of this invention is to provide a security arrangement for permitting and/or denying access past such security areas as windows, doors or analogous security zones.

FEATURES OF THE INVENTION

In keeping with these objects and others which will become apparent hereinafter, one feature of this invention resides, briefly stated, in an arrangement for, and a method of, detecting an object in an area subject to environmental variations. The arrangement comprises a transmitter means for transmitting a light beam along an optical path extending across the area during a first time period. A receiver means is situated in the optical path and is exposed to the environmental variations. During the first time period, the receiver means detects the light beam and responsively generates a first pulsed signal having a pulse width indicative of the detected beam and the environmental variation. During a subsequent second time period, the receiver means detects the environmental variation and responsively generates a second pulsed signal having a pulse width indicative of the environmental variation.

In accordance with this invention, control processor means are provided for establishing a reference value, for generating an environmental variation-resistant, differential measurement value corresponding to a difference between the pulse widths of the first and second signals, and for generating a control signal indicative of the presence or absence of the object in the area when the differential measurement value differs from the reference value by a margin value.

In the preferred embodiment, the transmitter means is a first transmitter means operative for transmitting a first light beam along a first optical path across the area. A second transmitter means is also provided for transmitting a second light beam along a second optical path remote from the area. The receiver means is common to both transmitter means and is situated in both optical paths. Upon receiving the first and second light beams, the receiver means respectively generates first and second signals, both changeable by exposure to the environmental variations. The aforementioned differential measurement value, therefore, corresponds to the difference between these first and second signals.

Resistance to environmental variation is achieved by comparing the differential value, rather than a non-differential value, to the reference value. An arrangement which relies solely on one signal that varies with the environmental variation, will result in a variable measurement value, thereby leading to unpredictable, unreliable object detection. The instant invention, however, by relying on one transmitter means that has two different time periods, or on a pair of transmitter means, causes two signals to be generated, and both these signals are changed in the same way by exposure to the environmental variation. By determining the difference between the first and second signals, the environmental variation is factored out and essentially eliminated, thereby leading to predictable, object detection with a high degree of safety and reliability.

In an application where the area is an entranceway bounded by upright side walls, e.g., garage or elevator door jambs, the first transmitter means, the second transmitter means and the receiver are all advantageously mounted in a common support or module at one side wall, and a retroreflective means is situated at an opposite side wall for reflecting the first light beam back toward the module. Another embodiment includes mounting the first transmitter means at the one side wall, and mounting the second transmitter means and the receiver means at the opposite side wall. Preferably, each transmitter means includes an infrared light source.

In a preferred embodiment, the first transmitter means includes a single light source for generating the first light beam, and means for shaping the first light beam to have either a generally collimated configuration or a generally fan-shaped configuration across the entranceway. With the collimated configuration, the first light beam is advantageously a few centimeters off the floor, a few centimeters high, and has a generally circular cross-section. With the fan-shaped configuration, the first light beam bounds a generally thin, screen-like volume in space having height and width dimensions substantially larger than its thickness dimension substantially throughout the volume. It is also contemplated that the first transmitter means could include a plurality of light sources operative for transmitting a plurality of first light beams across the entranceway at various angles of inclination relative to the floor for even greater spatial coverage.

In the preferred embodiment, the control processor means includes pulsing means for alternately pulsing the first and second transmitter means to transmit first and second light beam pulses, respectively. The common receiver means receives the first and second light beam pulses and respectively generates first and second pulsed signals having first and second pulse widths, each proportional to the received light intensity. The control processor means generates the aforementioned differential measurement value by determining the difference between the first and second pulse widths. It is each pulse width that is changed by exposure to the environmental variation. For example, the greater the ambient light, the shorter each pulse width.

For even greater measurement accuracy, the pulsing means is operative over a plurality of cycles, and the first pulse widths are averaged over the plurality of cycles to obtain an average first pulse width, and the second pulse widths are also averaged over the plurality of cycles to obtain an average second pulse width. The differential measurement value is determined by the difference between the average first and second pulse widths.

Prior to an object detection mode of operation in which the arrangement is detecting the presence or absence of an object in the area, the aforementioned reference value is established during a calibration mode in which the area is free of all objects. The first and second transmitter means are operated, as previously described, to generate the first and second signals from the receiver means. The control processor means generates the reference value as the difference between the first and second signals as determined during the calibration mode. Hence, even though the reference value could, for example, be a non-differential value, e.g., a fixed or variable setting established either in advance or during operation, it is desirable to make the reference value also resistant to environmental variations. This is accomplished by generating the reference value as a differential value. For even greater accuracy, the reference value is determined by the difference between the average first and second pulse widths of the first and second light beam pulses generated during the calibration mode over a plurality of cycles in which the first and second transmitter means are alternatingly pulsed.

The aforementioned margin value indicates the sensitivity of the arrangement. For a practical system, the sensitivity should be greater than zero. The sensitivity is either a fixed value set in advance or is an adjustable value which is dynamically set during operation to be a percentage of the intensity of the first light beam received at the receiver means. An object is recognized when the measurement value equals or exceeds the reference value by said sensitivity. When the difference between the measurement value and the reference value is less than said sensitivity, then it is assumed that there is no object in the area.

Prior to the calibration mode, the first and second transmitter means are alternatively pulsed as before, during a setup mode, in which the intensity of the second light beam is adjusted to minimize the difference between the first and second signals. Rendering the arrangement resistant to environmental variation is dependent on the assumption that the environmental variation will equally affect both the first and second signals. Although both the first and second signals are monotonically related to the environmental variation, that is, both the first and second signals are affected in the same direction, they are not identically affected to the same extent due primarily to non-linear electronic components in the control processor means. To overcome such non-linearity, both the first and second transmitter means must be configured to appear electronically as identical as possible to the control processor means.

In the preferred embodiment, the amplitude of the second transmitter means is adjusted so that the resultant second signal has the same, or nearly the same, pulse width as that of the first signal. During the setup mode, the control processor means increases the supply voltage applied to the second transmitter means in steps. By increasing the supply voltage, the intensity of the light beam from the second transmitter means increases and, in turn, the pulse width of the second signal. This voltage increase continues until the pulse width of the second signal matches, or nearly matches, the pulse width of the first signal. Once the pulse widths match, the corresponding supply voltage supplied to the second transmitter means is set and maintained for the subsequent calibration and object detection modes.

Prior to the setup mode, the arrangement has to be installed on site with optical alignment between the first transmitter means and the receiver means. If the retroreflective means is used, then the retroreflective means must also be optically aligned with the first transmitter means and the receiver means. This is accomplished during an install mode which is initiated by powering up the arrangement when the first light beam is completely blocked. Thereupon, an indicator, either a visual display or an annunciator, is controlled by the control processor means to indicate when the receiver means is receiving the first light beam with maximum intensity.

Still another feature resides in rendering the arrangement fail-safe. During the install mode, the receiver senses the intensity of the first light beam. This sensed intensity is then compared to an expected range of intensities corresponding, for example, in a garage door case, to an entranceway distance of from about 6 feet to about 20 feet. If the sensed intensity is too strong, i.e., an object is detected closer than 6 feet, or if the sensed intensity is too weak, i.e., the object is detected as being greater than 20 feet away, then the arrangement will not allow itself to be installed.

The novel features which are considered as characteristic of the invention are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWINGS

FIG. 4 is an electrical circuit diagram of the components mounted within the module of FIG. 2;

FIGS. 11a, 11b and 11c depict signal waveforms for the circuit of FIG. 10;

FIGS. 12a and 12b depict additional signal waveforms for the circuit of FIG. 10;

FIG. 13 is a partly broken-away, perspective view of an alternate optical transmission sub-system for use with the invention;

FIG. 14 is a partly broken-away, perspective view of an alternate optical receiving sub-system for use with the invention;

FIG. 15 is an elevational, diagrammatic view of an elevator door control system in accordance with this invention;

DETAILED DESCRIPTION OF THE PREFERRED EMBODIMENTS

Figure 1:
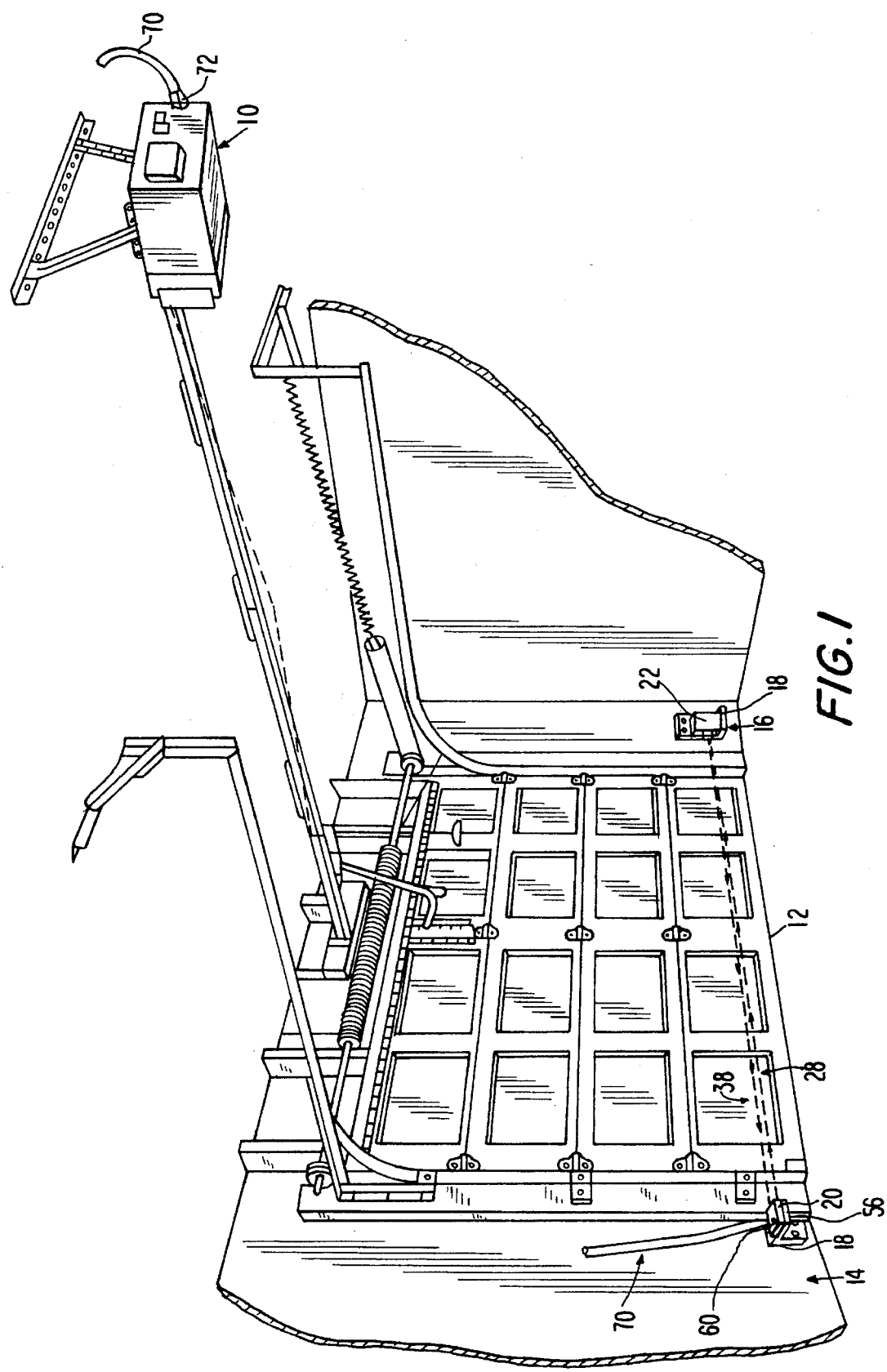
FIG. 1 is a perspective view of a preferred embodiment of an arrangement in accordance with this invention in a garage installation.

Referring now to the drawings, FIG. 1 depicts a typical residential garage door operator system as viewed from inside a garage. The major components include an overhead receiver/operator unit 10 with an internal reversible drive motor operative through a force-transmitting transmission to raise or lower or otherwise control a door 12. The door 12 is mounted in an open area or entranceway between a pair of jambs or upright side walls 14, 16. An arrangement in accordance with this invention is preferably mounted on the side walls 14, 16 with the aid of adjustable, stand-off brackets 18, and is operative for detecting the presence or absence of an object, e.g., a person, thing or analogous obstruction, in the entranceway, and for controlling movement of the door 12 in accordance with such detection.

Figure 2:
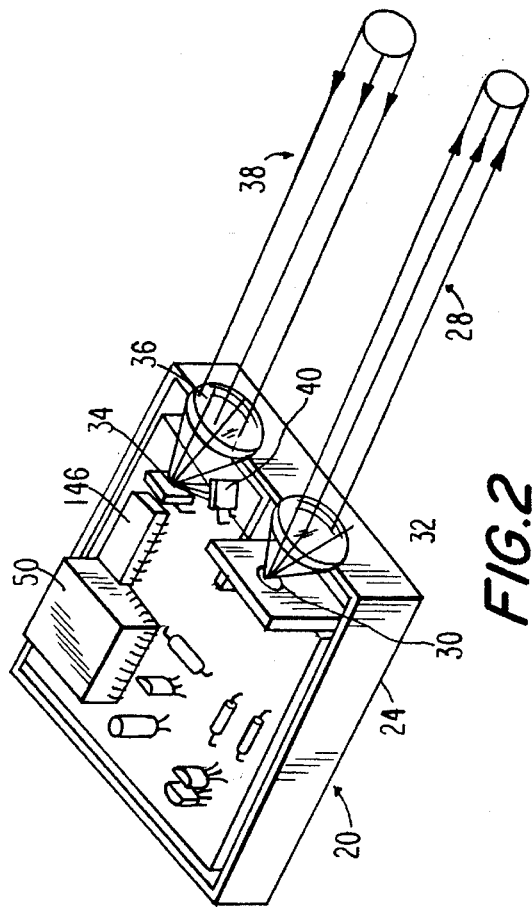
FIG. 2 is an enlarged perspective view of a module, with its cover removed, for use in the arrangement of FIG. 1.
Figure 3:
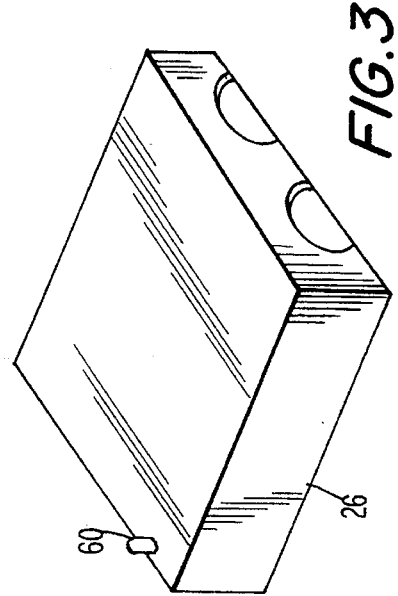
FIG. 3 is a perspective view of the cover removed from the module of FIG. 2.

A module or housing 20 is mounted on one of the side walls, e.g., wall 14. A retroreflective element 22 is mounted on the opposite side wall 16. In the preferred embodiment, all of the electrical components are mounted in the housing 20. As best shown in FIG. 2, the housing 20 has a lower half or base 24 in which various electrical and optical components are mounted. FIG. 3 shows the upper half or cover 26 that is assembled on the base 24. FIG. 4 is an electrical circuit diagram depicting how all the electrical components are interconnected.

Returning to FIG. 2, a first or main transmitter means is operative for transmitting a first or main light beam 28 along a first optical path extending across the entranceway (see FIG. 1). The main transmitter means includes a light source 30, preferably an infrared light emitting diode, for generating the main beam, and optical means, preferably a convex lens 32, operative for optically modifying the main beam 28 to have a generally collimated configuration. Source 30 is positioned at the focal point of the lens 32. The main beam 28 has a generally circular cross-section and, as previously noted, travels in one direction across the entranceway and strikes the retroreflective element 22 for reflection therefrom. The retroreflective element reflects a major portion of the main beam back toward the housing.

The housing 20 also includes a receiver means for receiving the light reflected from the retroreflective element 22. The receiver means includes a light detector 34, preferably an infrared sensor, having a field of view, and optical means, preferably a convex lens 36, operative for optically modifying the field of view to have a generally collimated configuration. Detector 34 is positioned at the focal point of lens 36. At least a part of the main beam 28 reflected off the retroreflective element 22 travels back in an opposite direction generally parallel to the first direction across the entranceway for receipt by the detector 34 (again, see FIG. 1).

Also mounted in the housing 20 is a second or auxiliary transmitter means 40 operative for transmitting a second or auxiliary light beam 42 along a second or auxiliary light path located entirely within the housing and, hence, remotely from the entranceway. The second transmitter means includes an auxiliary light source, preferably an infrared light emitting diode, and operative for generating and directing the second beam 42 along a direct linear or folded path to the detector 34. Thus, the detector 34 not only receives the main beam 28 in its field of view 38, but also receives the auxiliary beam 42 for a purpose to be described below.

As best seen in FIG. 4, detector 34 is operatively connected through an integrator 44 consisting of resistor R6 and capacitor C8 to an integrated circuit 46, ITT Model No. TBA2800. Integrated circuit 46 includes four stages of signal amplification. The first stage is a low noise amplifier (LNA) that receives an analog current signal from the detector 34 and converts it to voltage. The second stage is an automatic gain control (AGC) amplifier. The third stage is a gain stage operational amplifier that has been modified by the integrator 44 to operate as an integrator amplifier. The final stage is a high gain squaring circuit amplifier. The use of the integrator 44 with the integrated circuit 46 allows for conversion of the received light intensity to a pulsed signal having a pulse width proportional to the intensity of light detected by the detector 34. This pulsed signal is conducted over receive line 48 to an input terminal of a control processor 50, preferably Model No. 8751-PLCC. The integrator 44 and integrated circuit 46 essentially serve as an amplifier and part of an analog-to-digital converter. The processor 50 converts the converter output to digital data. To resist stray electromagnetic interference, a shield 51 is positioned around the converter except, of course, in those zones where the main and auxiliary beams enter the detector 34. The shield 51 has been omitted from FIG. 2 for clarity of illustration.

The control processor 50 has an output terminal connected to the main source 30 over transmit1 line 52. Processor 50 has another output terminal connected to the auxiliary source 40 over transmit2 line 54. Processor 50 has still another output terminal connected to an output connector 56 over signal line 58. Connector 56 is, as described below in connection with FIG. 5, connected to the receiver/operator unit 10 via a cable 70. Processor 50 has yet another output terminal connected over indicator line 62 to an indicator 60, preferably a light emitting diode (see FIG. 3), mounted on the cover 26.

Before describing the operation of the processor 50 in detail, one aspect of this invention is concerned with rendering the arrangement resistant to environmental variations such as ambient light and temperature fluctuations. As explained below, the processor is operative, during an object detection mode, for pulsing the main source 30, thereby transmitting a pulsed main beam to and from the retroreflective element 22 for reception by the receiver 34. In turn, the receiver 34 generates an analog signal which is converted by the converter to a pulsed signal having a pulse width proportional to the intensity of the received light. The pulse width is indicative of the presence or absence of an object in the area. Thus, a pulse width equal to or exceeding a certain value would be interpreted as indicating that the area is free of any object, thereby allowing the door to close, whereas a pulse width below the certain value would be interpreted as indicating that the area contains an obstruction, thereby stopping or reversing the closing door.

A technical problem arises in that the received light can come from sources other than the main source 30. For example, the receiver 34 is also exposed to ambient light. The ambient light level fluctuates as sunlight varies during the day, as headlights or other outdoor lights vary, as indoor lights are switched on and off, etc. The greater the ambient light level, the shorter the pulse width, and vice versa. In some cases, the ambient light level can corrupt the pulse width determination and lead to an incorrect determination whether an object is or is not present in the area, possibly leading to personal injury and/or property damage. One feature of this invention solves that technical problem.

Figure 6:
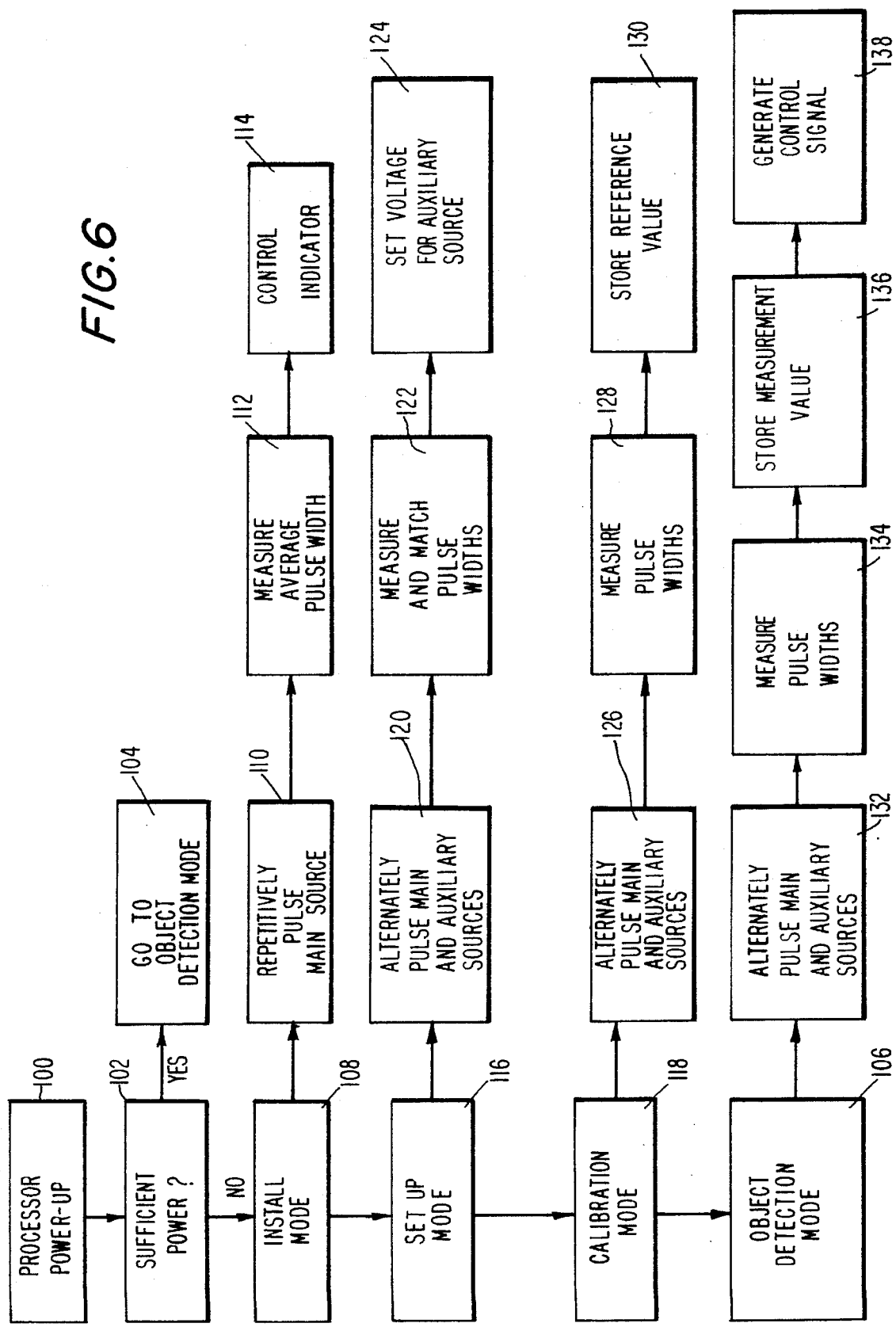
FIG. 6 is a flow chart depicting various operational modes of the arrangement of FIG. 1.

The processor 50 is programmed to execute different operational routines or modes. As shown in the flow chart of FIG. 6, upon power-up 100, the processor 50 pulses the main source 30 over line 52, and measures the pulse width of the pulsed signal arriving on line 48 in order to determine the intensity of the received light. The intensity is proportional to the pulse width. The processor has internal counter/timers. When the pulsed signal initially goes from a low level (logic 0) to a high level (logic 1), one internal timer starts counting the pulse width in one microsecond increments, and then stops counting when the pulsed signal returns to the low level. The resulting measurement of the number of counts is indicative of the pulse width. For greater measurement accuracy, this measurement is repeated a number of times by repetitively pulsing the main source 30, by measuring the corresponding pulse widths, and then by averaging the pulse width measurements to measure the average pulse width and, in turn, the average intensity of the received light.

If sufficient main beam power is seen at step 102 at the receiver, the processor checks if a prior calibration is stored in memory, loads these stored values and proceeds at step 104 to the object detection mode (step 106). If not, the processor proceeds to the install mode (step 108).

The install mode can be forced by having an installer block lens 32 at power-up by placing his or her hand thereover. The processor responds by pulsing the visible indicator 60 at a 1 Hertz rate until the reflected main beam is seen at the receiver. The main source is pulsed (step 110) and the processor looks for any reflected power (step 112) at the receiver. The installer will then move the housing 20 and/or the retroreflective element 22 relative to their respective adjustable brackets 18 in order to increase the measured average light intensity. As the arrangement is moved closer to alignment and the amount of reflected power increases at the receiver, the visible indicator pulse rate is increased (step 114) until sufficient power is detected, at which time the visible indicator rate is constant. If the arrangement is moved away from the optimum alignment, the pulse rate of the visible indicator is decreased until no power is seen at the receiver, the pulse rate being again at 1 Hertz. Alternately, when the measured average light intensity reaches a predetermined intensity, then the processor will deactivate or extinguish the indicator 60. If the housing 20 and/or the retroreflective element 22 is moved too far, then the indicator 60 will be turned on again. The extinguishing of the indicator 60 serves as a clear visible indication to the installer when optical alignment, i.e., maximum light transmission, has been achieved.

Other indicators are contemplated by this invention. For example, an audible annunciator, such as a buzzer, could be used. Alternatively, rather than merely sounding the annunicator between steady-state on and off conditions, the annunicator may be caused to sound at different rates as a function of the measured average light intensity. When the maximum sound rate is achieved, this indicates that the maximum measured light intensity is being received, whereupon the processor then cycles the annunicator 60 off.

Power measured by the receiver is converted to a pulse width that is a relative measurement of the power from the main source above background power (combination of ambient light and temperature characteristics of the system). If the power measurement taken by the receiver is not sufficient to normally operate the system, either an obstruction is in the main beam path, or the reflector is missing or mis-aligned, or there is a large amount of ambient light. To identify ambient light as the limiting effect on the receiver, the auxiliary beam is arbitrarily set to a known intensity and the auxiliary source power is measured. If the auxiliary signal power is also low, the arrangement proceeds to initialize the processor for high ambient light levels.

If the power seen at the receiver exceeds its range, the main beam intensity is decreased by the processor until the maximum signal seen by the receiver is within the range of the receiver. This calibrates the main beam intensity. If the power seen at the receiver still exceeds the range of the receiver after decreasing the main beam intensity to the lowest possible setting, the processor will pulse the indicator 60 at a 1 Hertz rate indicating that the reflector is too close to the receiver for safe operation.

Once the main beam has been detected and calibrated, the system needs to be power cycled to proceed to the setup mode (step 116). Prior to entering the setup mode, the processor detects whether there is a prior calibration data stored in a memory, e.g., an EEPROM. If the calibration variables have been stored, these values are applied to the system, and the system then proceeds directly to the object detection mode (step 106). Otherwise, the processor enters the setup mode.

During the subsequent calibration (step 118) and object detection (step 106) modes, the auxiliary source 40 will be used, together with the main source 30, to factor out the effects of environmental variations. Before using the auxiliary source 40, however, in order to prevent potential non-linear errors from being introduced to the measurements due to the use of two different light sources 30, 40, the setup mode is employed to electronically match these two light sources 30, 40.

In the setup mode, the processor pulses at step 120 the main source 30 and measures at step 122 the pulse width of the pulsed signal generated by the converter. Thereupon, the processor pulses at step 120 the auxiliary source 40 and measures at step 122 the pulse width of the pulsed signal generated by the converter. If the two pulse widths do not match, then the controller increases at step 124 a supply voltage to the auxiliary source 40 by a predetermined amount. For example, as shown in FIG. 4, the processor incrementally increases the supply voltage by sequentially selecting over line 54 one of the resistors R17 through R23 in a resistor bank.

By increasing the supply voltage, the auxiliary source 40 emits more light, and the resultant pulse width is increased proportionately. The controller increases the supply voltage in increments until the pulse widths of the pulsed signals derived from the main and auxiliary sources 30, 40 match as closely as possible. At this point, the final supply voltage is set and maintained for all subsequent operational modes. Now, the receiver and the converter cannot electronically distinguish whether the light is coming from the main source 30 or the auxiliary source 40 since their respective pulse widths are identical, or nearly so.

In the calibration mode (step 118), the main source 30 and the auxiliary source 40 are alternatingly pulsed (step 126) a predetermined number of times while the area is free of all objects. Their respective pulse widths of the pulsed signals derived from the main source 30 and the auxiliary source 40 are measured and averaged at step 128. The processor then determines at step 130 a reference or calibration value equal to the difference between the average pulse width of the signal derived from the main source 30 and the average pulse width of the signal derived from the auxiliary source 40. This reference value is stored and is used in the subsequent object detection mode.

In the object detection mode (step 106), the main source 30 and the auxiliary source 40 are alternatingly pulsed (step 132) a predetermined number of times, as described above. Their respective pulse widths of the pulsed signals derived from the main source 30 and the auxiliary source 40 are again measured and averaged (step 134). The processor then determines (step 136) a measurement value equal to the difference between the average pulse width of the pulsed signal derived from the main source 30 and the average pulse width of the pulsed signal derived from the auxiliary source 40. This measurement value is then compared with the aforementioned reference value.

If the measurement value equals or exceeds the reference value by a margin value (sensitivity), then an object is recognized as being present in the area, the visible indicator is extinguished for a given time, and an output control signal is transmitted at step 138 by the processor over line 58 to the receiver/operator unit 10 in order to stop, reverse, or otherwise control the closing door. If the measurement value is less than the reference value by said margin value, then an object is not recognized, and no output control signal is generated. The margin value can either be set in advance as an arbitrary number loaded into a memory location of the processor, or can be dynamically set during operation as a certain percentage of the average intensity of the measured light. When the sensitivity is constant, there is less sensitivity when the average intensity of the received light is less. However, when the sensitivity is made proportional to the received average light intensity, then the system will have the same sensitivity for different received average light intensities.

It will be noted that any object in the entranceway will only change the pulse width of the signal derived from the main source. However, any environmental variation, for example, ambient light, affects both the pulse width of the signal derived from the main source as well as the pulse width of the signal derived from the auxiliary source, because the receiver is open to ambient light and receives both the main and auxiliary beams. Thus, by generating the measurement value as a differential value, i.e., the difference between said pulse widths, the effect of ambient light is eliminated, because, to repeat, both pulse widths are affected by ambient light in the same way. Furthermore, by generating the reference value as a differential value, the effect of ambient light is still further factored out.

Although the setup and calibration modes could be performed in response to each power-up of the processor, this would not be desirable since an unwanted calibration may occur on resumption of power following a power failure. Indeed, the calibration mode might be performed when an obstruction is in the area. To prevent this possibility, a setup/calibration button can be installed on the housing, and the setup and calibration modes will only be initiated upon manual pressing of that button. This human involvement is intended to ensure that the area is free of all objects during the setup and calibration modes.

In addition, the arrangement could be provided with a non-volatile memory (EEPROM or RAM with back-up battery) in which the setup and calibration data is stored and not erased during power failures. This feature would eliminate the possibility of calibrating on highly reflective objects in the main beam transmitter's path. The calibration button would then force the loading of these values for initial installation, as well as any subsequent calibrations.

During the object detection mode, the visible indicator 60 would normally be on when there is no obstruction to the beam, and off when an obstruction is detected. If an obstruction should be detected that lasts longer than 1 minute, or if the unit has been bumped out of alignment such that it does not receive sufficient reflected energy for over 1 minute, the processor will pulse the indicator every 10 seconds to alert a user that the receiver needs attention.

An important feature of this invention centers around its fail-safe aspects. The arrangement will detect any unsafe condition that would not allow the processor to correctly detect an intrusion into the main beam and shut itself down. Such unsafe conditions include short circuits between pins, component failure of the receiver and/or interface circuitry, or complete failure of the microcontroller to operate correctly.

In addition, the calibration of the system has been designed to detect only the correct reflected signal from the retroreflector such that the system will not calibrate on anything other than the retroreflector. This is accomplished by use of a high quality retroreflector. Once calibration has been accomplished and stored into the EEPROM memory, the system will not re-calibrate on anything else.

The maximum system calibration is set for a door opening of 20 feet which represents the maximum operational distance. At all other distances shorter than this, up to a minimum distance of 6 feet (the minimum operational distance), the receiver will receive more power than the receiver can handle. As such, the arrangement, during the install made, will sense the amount of light reflected into the receiver, and scale the output pulse to deliver the required power. This level will be established at installation and stored in the EEPROM for future power-up conditions. This will allow the system to automatically load both the main and auxiliary calibration levels at power-up for the most recently stored installation/calibration cycle.

Figure 7:
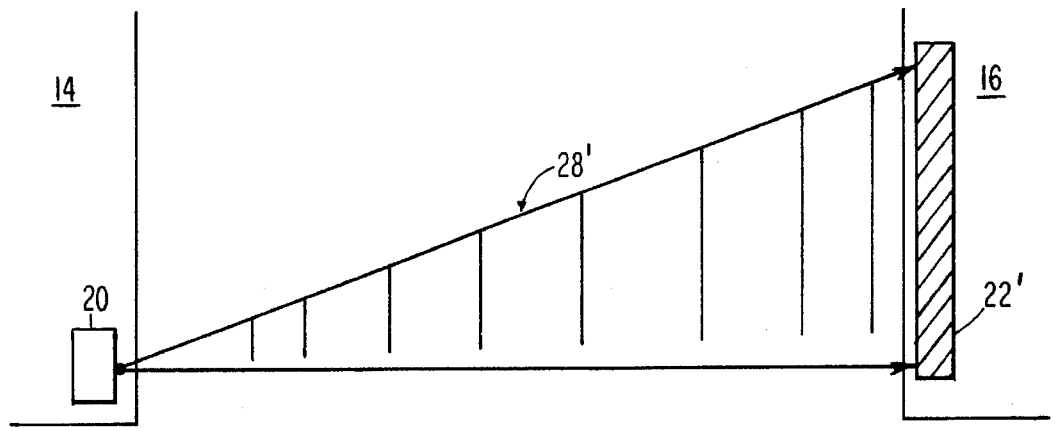
FIG. 7 is an elevational view of another embodiment of the arrangement of FIG. 1.

Other variations are contemplated for the arrangement of this invention. Thus, as shown in FIG. 7, rather than transmitting a generally collimated, cylindrical beam 22 across the entranceway, the transmitted beam can be configured to have a generally thin, screen-like volume 28' whose height dimension (above the floor) and width dimension (across the entranceway) is greater than its thickness dimension (into the plane of FIG. 7). To that end, the convex lenses 32, 36 depicted in FIG. 2 would be replaced by the spheric and cylindrical lenses disclosed in the optical arrangement described in co-pending U.S. patent application Ser. No. 08/102,541, filed Aug. 2, 1993, commonly owned by the assignee herein, the entire contents of said co-pending application being incorporated by reference herein. In the FIG. 7 arrangement, the retroreflective element 22' would be taller as compared to its height in the FIG. 1 embodiment. The generally thin, screen-like volume 28' is especially useful in garage door or window applications where the door or window is movable in a plane.

Figure 8:
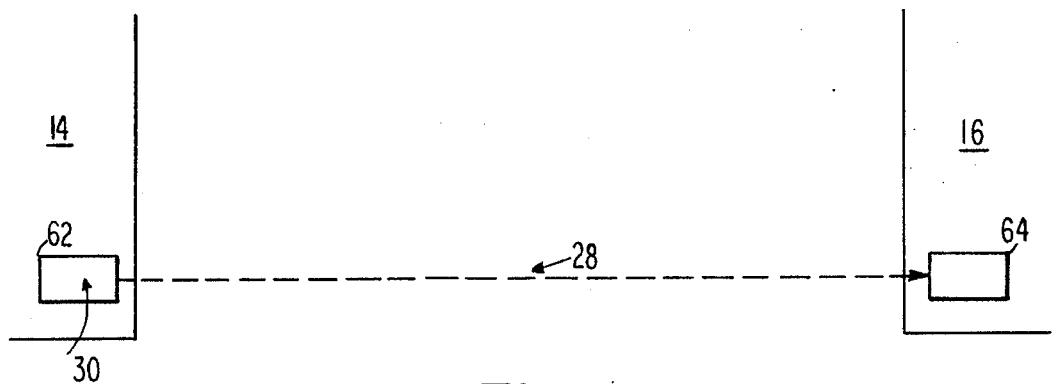
FIG. 8 is an elevational view of still another preferred embodiment of the arrangement of FIG. 1.

As shown in FIG. 8, the main transmitter means 30 is mounted in its own housing 62 on side wall 14, whereas all the other components previously described as being contained in housing 20 are mounted in another separate housing 64 on the opposite side wall 16. FIG. 8 depicts a double-sided system wherein the main transmitter and the receiver are on opposite sides of the entranceway, wherein the embodiments of FIGS. 1 and 7 are one-sided systems and are currently preferred for ease of installation.

Figure 9:
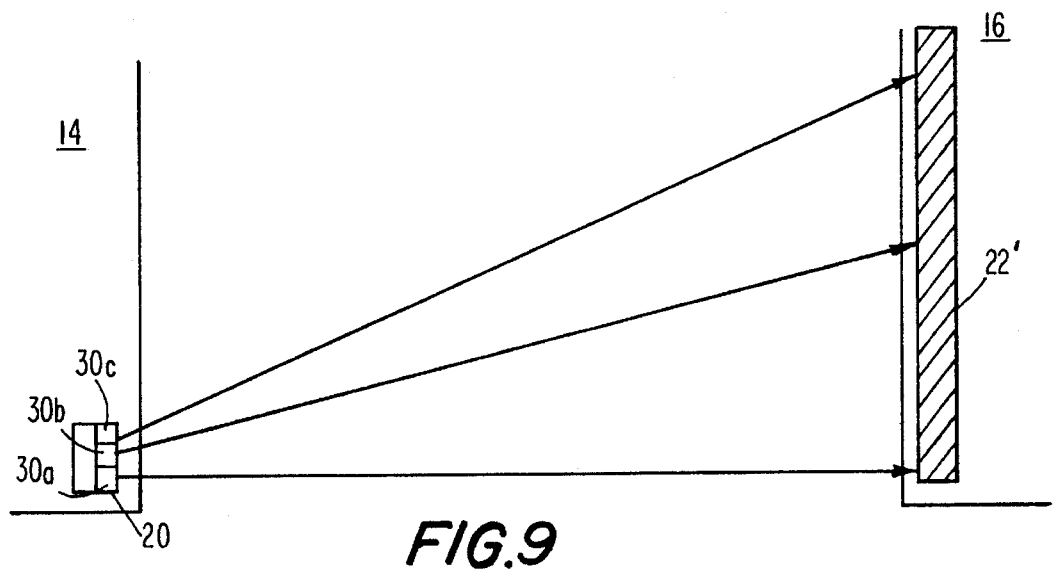
FIG. 9 is an elevational view of yet another preferred embodiment of the arrangement of FIG. 1.

FIG. 9 depicts still another embodiment wherein the main transmitter means 30 includes a plurality of light transmitters 30a, 30b, 30c each transmitter being operative for transmitting a respective main beam at different angles of inclination across the entranceway relative to the ground plane. Greater spatial coverage can therefore be achieved as compared to the embodiment of FIG. 1. A taller retroreflective element 22' is used for the FIG. 9 embodiment in order to reflect the various main beams back to the housing 20.

Figure 5:
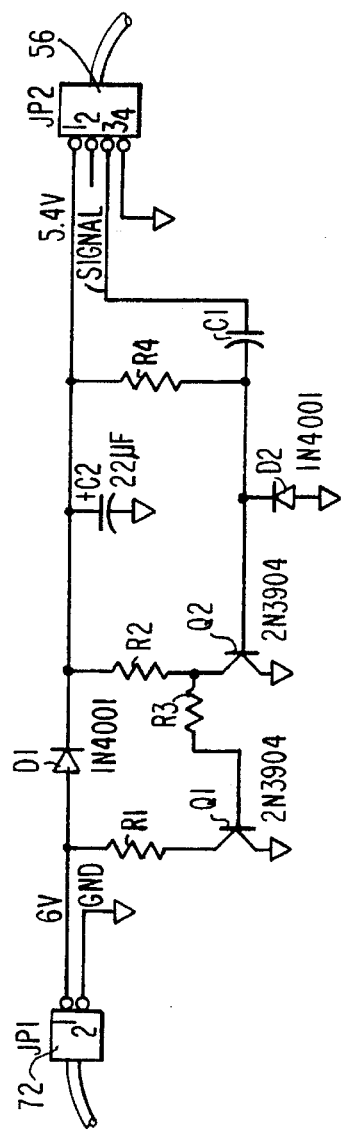
FIG. 5 is an electrical circuit diagram depicting a power/signal cable to be connected to the module of FIG. 2.

FIG. 5 depicts a power/data cable 70 having one end connector 72 connected to the receiver/operator unit 10 (see FIG. 1) and an opposite end connector 56 connected to the housing 20. Cable 70 delivers dc power from the unit 10 to the various electronic components in the housing 20, and also conducts data or command signals from the housing 20 to the unit 10.

An alternative configuration for the arrangement would replace the retroreflector with a non-reflective black target and operate the processor looking for reflections greater than some minimum value. Any object passing through the beam would reflect more energy than normally seen by the receiver and set the intrusion condition in the microcontroller.

Rather than using two light sources, environmental variations can be compensated for by using a single light source and having the receiver detect light during two different time-separated periods.

Figure 10:
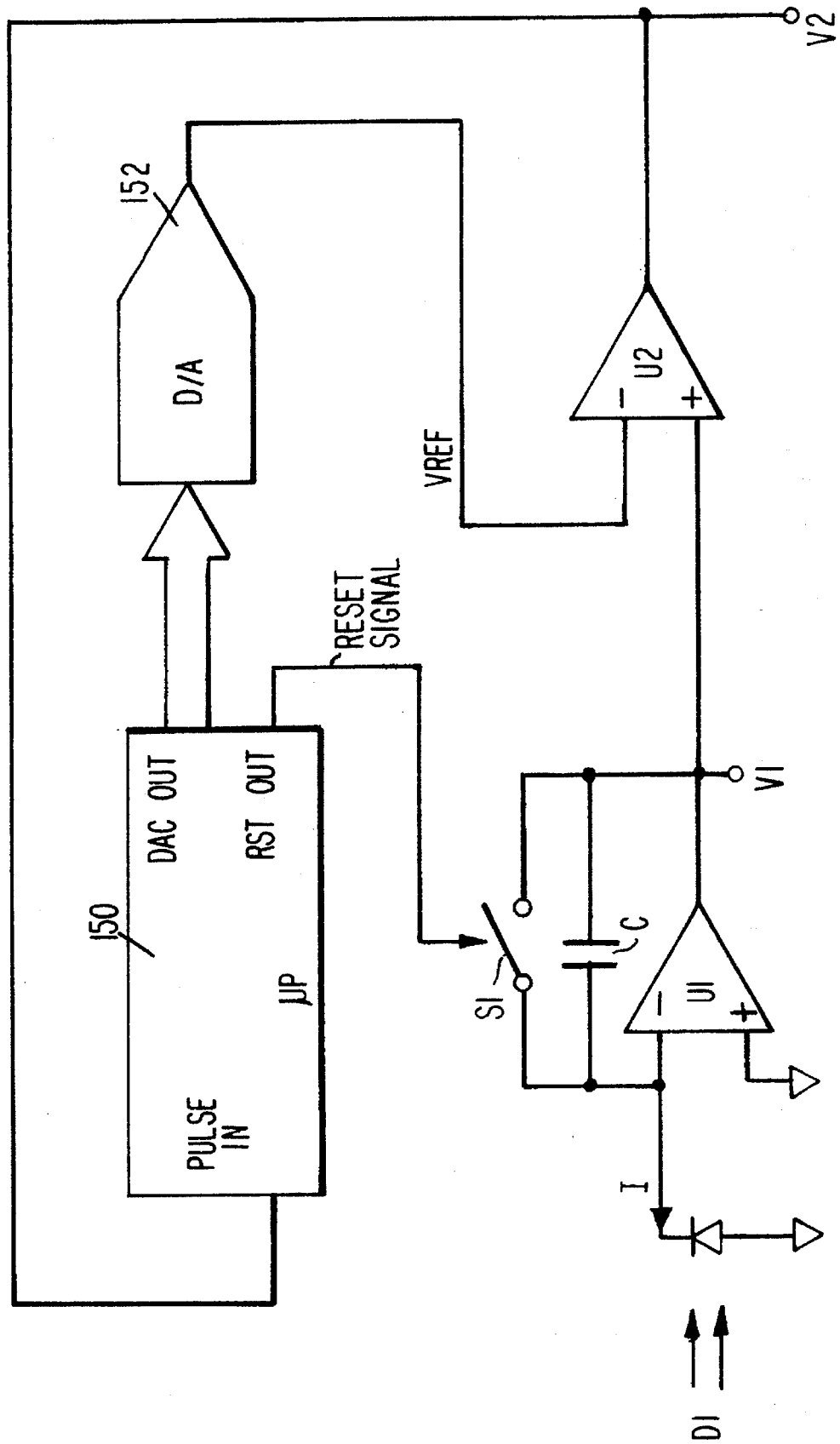
FIG. 10 is an electrical circuit schematic of an arrangement in accordance with another embodiment of this invention.

As shown in the circuit of FIG. 10, a processor 150 generates a RESET signal (see FIG. 11b) which discharges capacitor C through a switch S1. Incoming light is picked up by photodiode D1 which converts the light energy to a current I. As soon as S1 is opened (RESET-Low), the current I is integrated by integrator U1 and capacitor C, thereby creating a positive-going ramp voltage V1. As shown in FIGS. 11a and 12a, once voltage V1 reaches the voltage level VREF set by a digital-to-analog converter 152, the output of comparator U2 goes high and remains high until capacitor C is reset through switch S1. In this application U1 is used as a integrator while U2 is used as a comparator. The output voltage V2 (see FIG. 11c) has a pulse width T which is directly proportional to the current I which, in turn, is proportional to the input light energy. Therefore, by measuring the pulse width T, the total incident light at the detector can be measured.

In operation, the pulse width T is measured for two consecutive cycles. In one cycle, a main infrared light source is turned on while, in the other cycle, the source is turned off. The two values for T (see FIG. 12b) are then subtracted from each other. In this way, any effect due to ambient light and/or temperature is eliminated, resulting in the net power from the light source.

The digital-to-analog converter 152 is used to set the voltage VREF. By changing voltage VREF, the sensitivity of the circuit can be changed. The sensitivity of the system needs to be adjustable in order to better adapt the system to different levels of ambient light. The effect of VREF on T is evident from the following equation, the pulse width being inversely proportional to VREF:

$$T = \frac{I}{C \cdot VREF}.$$

As previously mentioned, the beams 28, 38 need not have a cylindrical, collimated configuration, but can have a generally flat fan-shaped configuration as taught in U.S. Ser. No. 07/776,669, filed Oct. 15, 1991, and U.S. Ser. No. 08/102,541, filed Aug. 2, 1993. To that end, the lens 32 is replaced by the cylindrical lens 200 and the spherical lens 202; and the lens 36 is replaced by the cylindrical lens 204 and the spherical lens 206.

Each spherical lens 202, 206 has uniform magnification or focusing power in all directions in a two-dimensional cross-sectional plane perpendicular to its optical axis. Each cylindrical lens 202, 204 has a magnification or focusing power in a single direction in a two-dimensional cross-sectional plane perpendicular to its optical axis. For example, cylindrical lens 204 as illustrated in FIG. 14 magnifies the beam only in one direction at sensor 34. This being true, the field of view seen by sensor 34, through the combined power of lenses 204 and 206, is spread as illustrated by sensing space 208. Analogously, the lenses 200, 202 spread the outgoing transmission beam or emission space 210 in only one direction. Each space has a thickness much less than its cross-sectional height or width. Due to the close spacing between the source 30 and the sensor 34, the sensing and emission spaces substantially overlap each other.

These overlapping spaces create a generally flat spatial zone or curtain which have myriad applications. Thus, as shown in FIG. 15, a pair of modules 20 each emitting curtain zones 252, 254 effectively cover the entire plane of an elevator door in an elevator control system 250.

Figure 17:
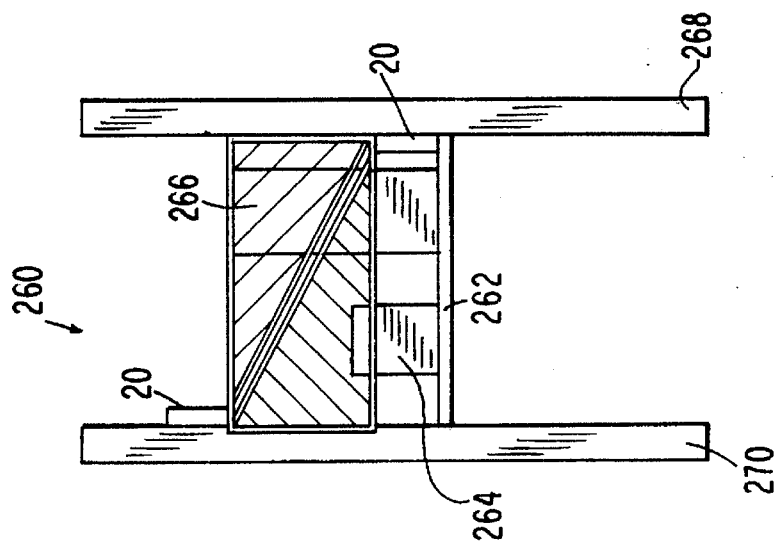
FIGS. 16 and 17 are a perspective view and a side elevational view, respectively, of an object detection/inventory control system in accordance with this invention.
Figure 16:
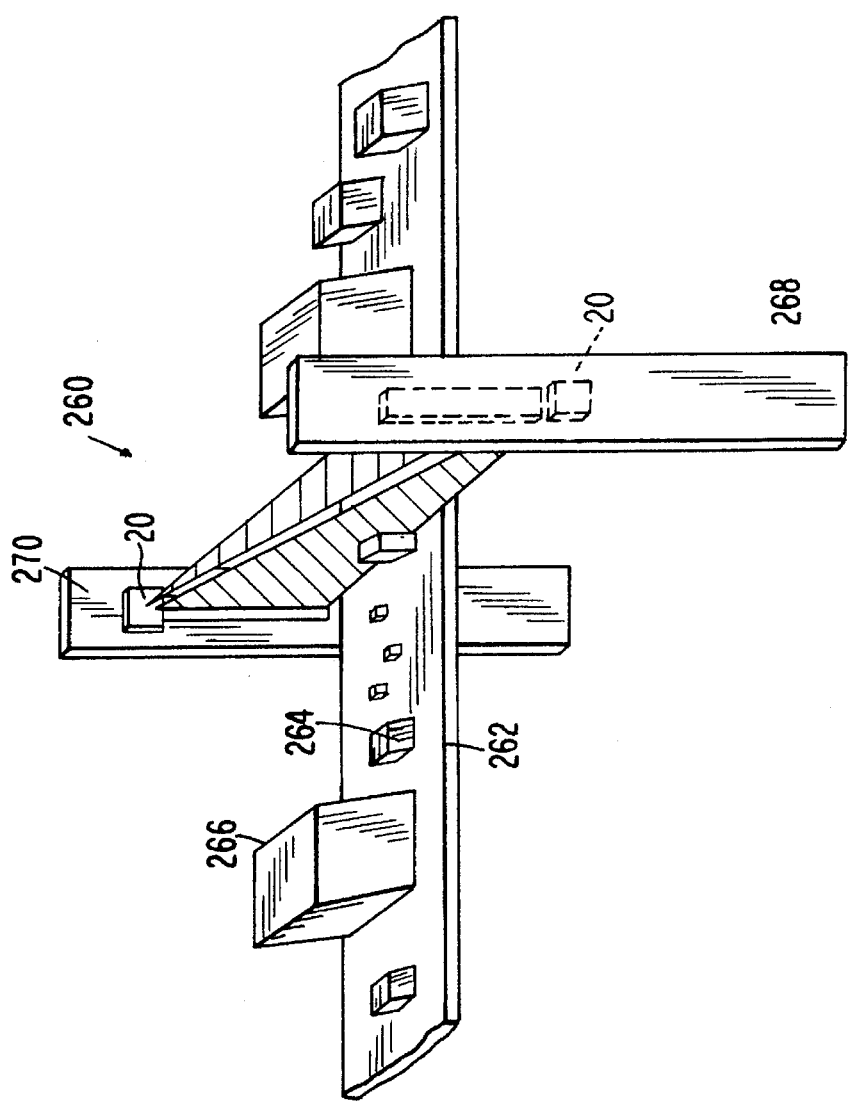

FIGS. 16 and 17 depict an inventory control system 260 in which a conveyor belt 262 on which small and large objects 264, 266, respectively, are supported is moved through a pair of uprights 268, 270. The aforementioned modules 20 are mounted on the opposite uprights at different elevations and operate to effectively cover a vertical plane that is perpendicular to the direction of advancement of the belt 262. The objects 264, 266 break at least one of the curtain zones emitted by the modules 20, thereby generating a control signal used for object detection and inventory control.

Figure 18:
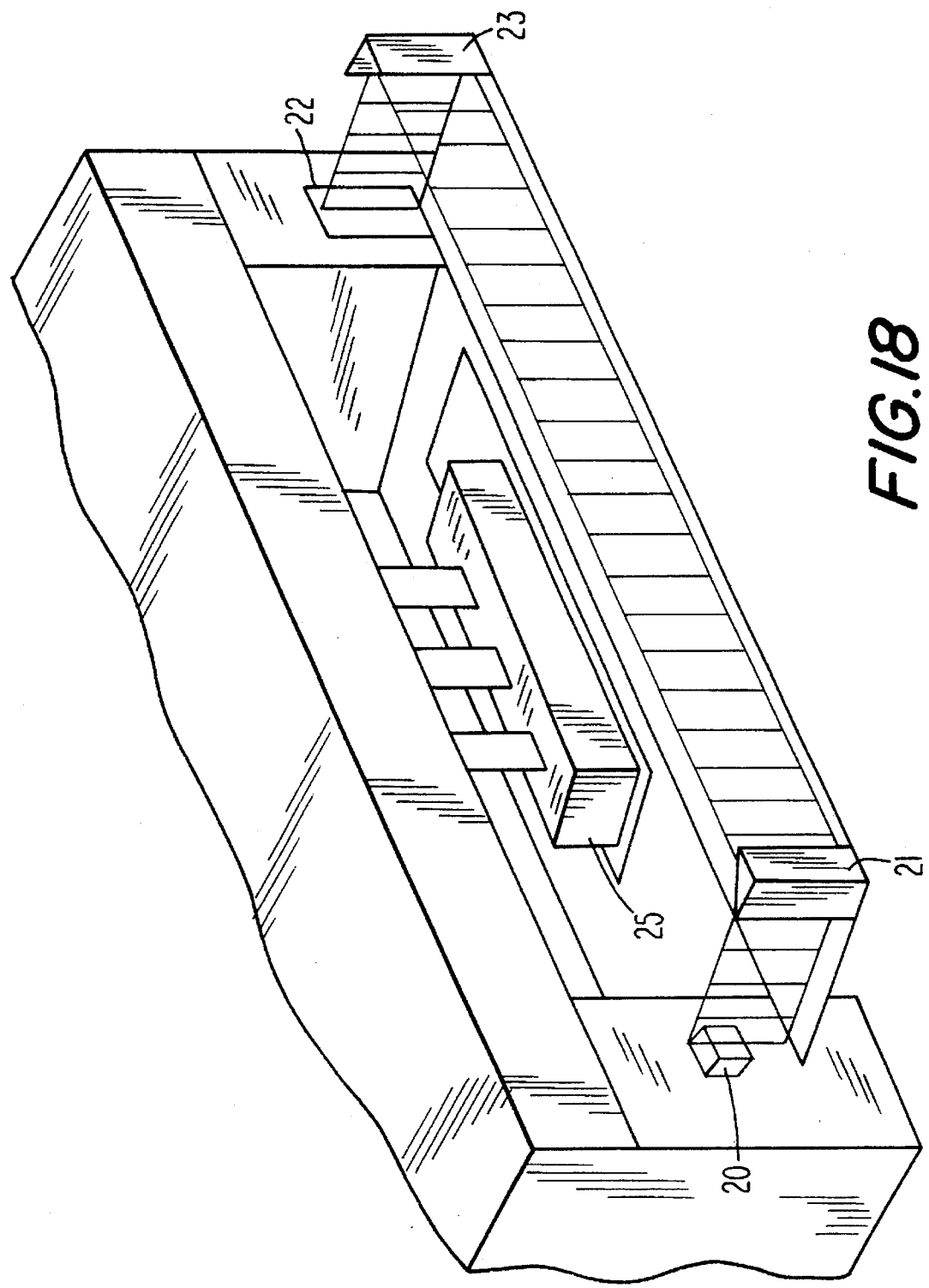
FIG. 18 is an overhead, perspective view of a security control system at an industrial site in accordance with this invention.

FIG. 18 depicts a module 20 mounted on an upright side wall of a security zone in which an industrial machine 25 to be protected is contained. On an opposite side wall, a retroreflective element 22 is mounted. Reflective panels or mirrors 21, 23 are spaced apart from each other and from the module 20 and the element 22 in order to define a three-sided security zone.

Figure 19:
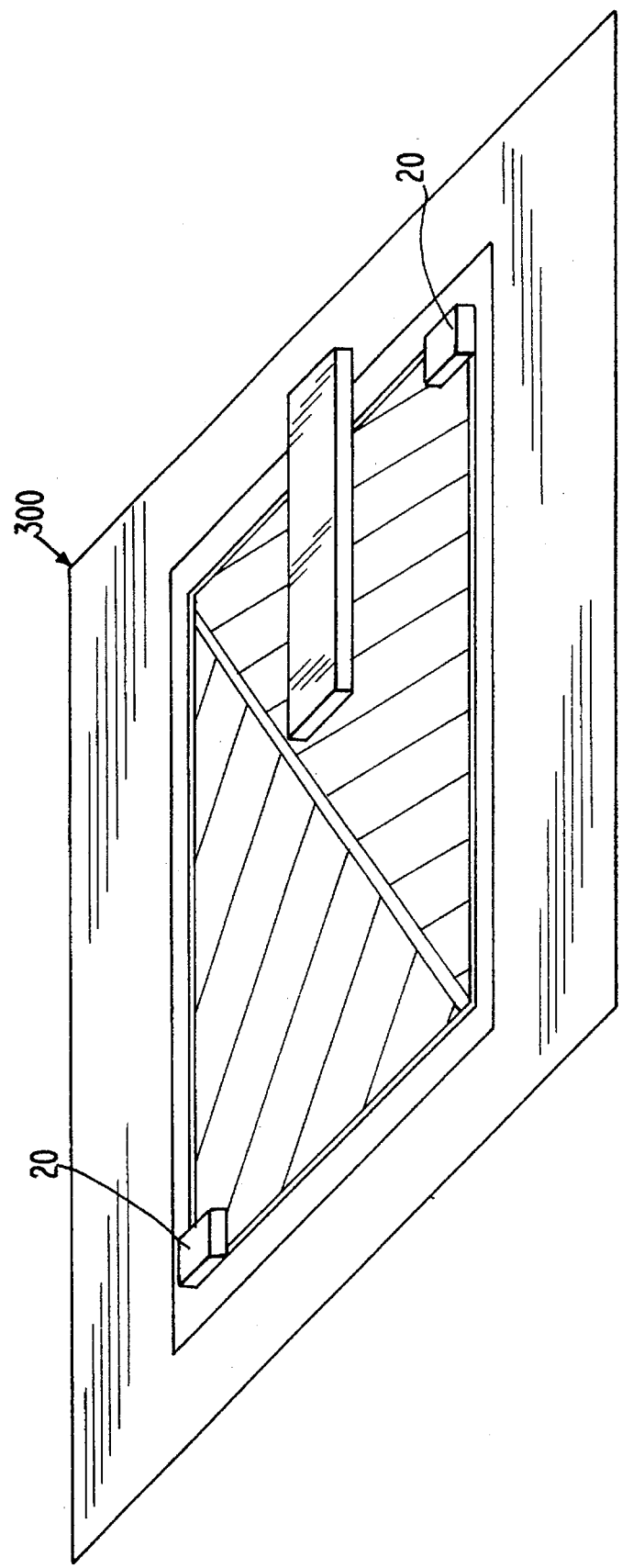
FIGS. 19 and 20 are perspective, diagrammatic views of two alternate embodiments for safeguarding a swimming pool in accordance with this invention.
Figure 20:
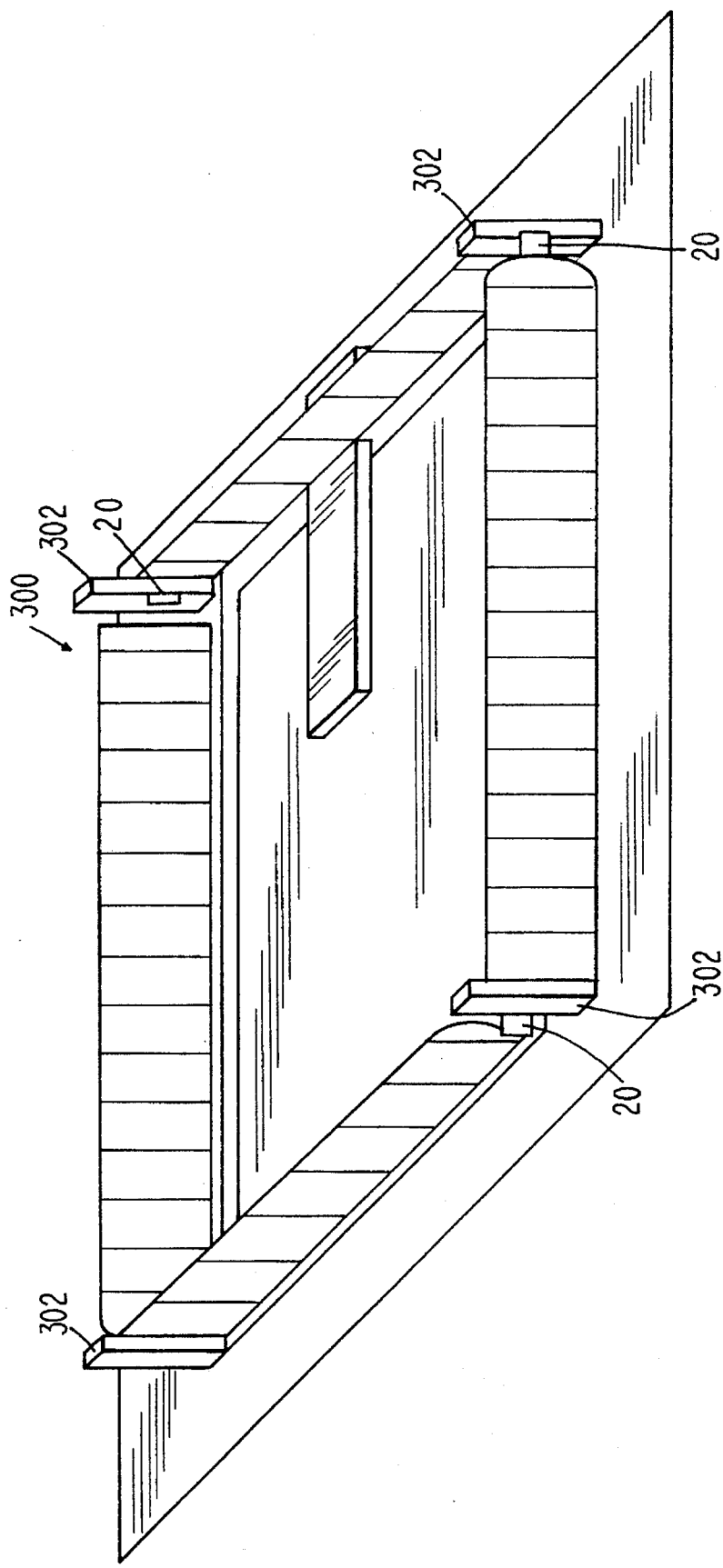

FIGS. 19 and 20 depict a swimming pool 300, and two schemes for deploying the modules around the perimeter of the pool to create a safety curtain. In FIG. 19, each module 20 is located at opposite corners of the pool and emit the generally flat curtain in a plane which overlies and is generally parallel to the water level. In FIG. 20, each module 20 is located on corner uprights 302 and emit respective generally flat curtains in a plane which is generally perpendicular to the water level.

Figure 21:
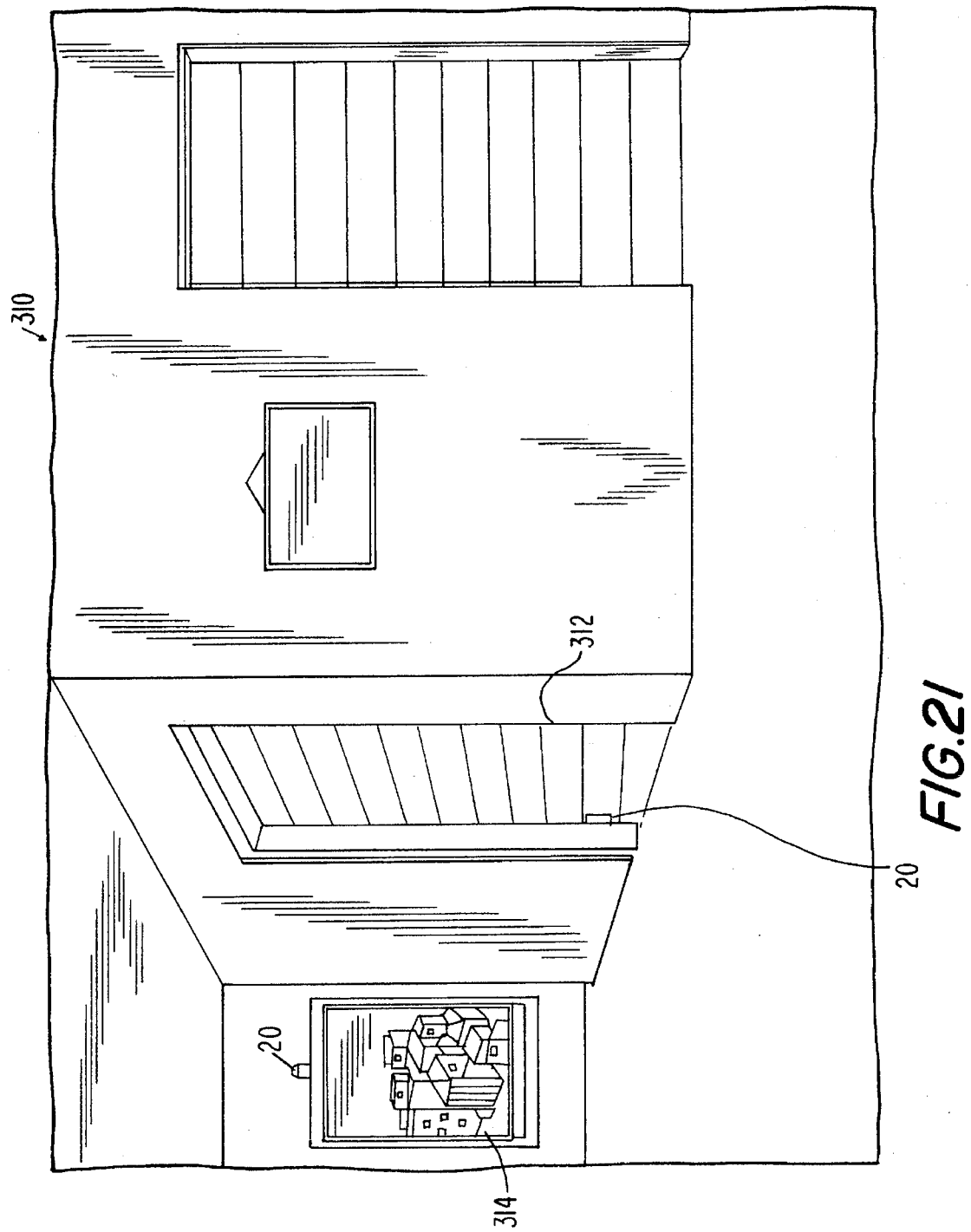
FIG. 21 is an isometric, diagrammatic view of the invention used in an interior room setting.

In FIG. 21, the interior of a room 310 is depicted and a module 20 can be placed adjacent an interior doorway 312 or, as shown, adjacent a window 314. In this embodiment, as well as in all the previous embodiments, an intruder breaking the curtain will generate a control signal as described above. This control signal can be used not only for controlling a door as described above in connection with garage and elevator door systems, but also for granting or denying access to a security zone to be safeguarded.

It will be understood that each of the elements described above, or two or more together, also may find a useful application in other types of constructions differing from the types described above.

While the invention has been illustrated and described as embodied in an arrangement for and method of detecting an object in an area subject to environmental variations, it is not intended to be limited to the details shown, since various modifications and structural changes may be made without departing in any way from the spirit of the present invention.

Thus, the instant invention is not intended to be limited to garage doors, elevator doors, or doors in general, but can equally well apply to windows and, in fact, any area, both outdoor and indoor, that is or can be exposed to environmental variations. This invention has broad utility to security systems in which access to secure areas is to be denied or granted.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set forth in the appended claims.

We claim:

1. An arrangement for detecting an object in an area subject to environmental variations, comprising:
    a) a first transmitter means for transmitting a first light beam along a first optical path extending across the area;
    b) a second transmitter means for transmitting a second light beam along a second optical path remote from the area;
    c) a common receiver means subject to the environmental variations and situated in both the first and second optical paths for receiving the first and second light beams, and for respectively generating first and second digital signals that are both changeable by exposure to the environmental variations; and
    d) control processor means for establishing a reference value, for generating an environmental variation-resistant, differential measurement value corresponding to a difference between the first and second digital signals, and for generating a control signal indicative of the status of the object in the area when the differential measurement value differs from the reference value by a margin value.

2. The arrangement according to claim 1; and further comprising first support means for supporting the first transmitter means at one side of the area, and second support means for supporting both the second transmitter means and the common receiver means at an opposite side of the area.

3. The arrangement according to claim 1; and further comprising common support means for supporting the first transmitter means, the second transmitter means and the common receiver means at one side of the area, and retroreflective means situated at an opposite side of the area in the first optical path for reflecting the first light beam emitted from the common support means back toward the same.

4. The arrangement according to claim 3, wherein the area is an entranceway bounded by upright walls, and wherein the common support means includes a housing mounted on one of the walls, and wherein the retroreflective means includes a retroreflective element mounted on another of the walls located across the entranceway from said one of the walls.

5. The arrangement according to claim 1, wherein each of the first and second transmitter means includes an infrared source for generating an infrared beam.

6. The arrangement according to claim 1, wherein the first transmitter means includes a first light source and means in the first optical path for optically modifying the first light beam emitted by the first light source to have a generally collimated configuration during transmission across the area, and wherein the common receiver means includes a receiver having a field of view and means in the first optical path for optically modifying the field of view to focus the generally collimated light beam onto the receiver.

7. The arrangement according to claim 6; and further comprising a housing for supporting the first light source and the receiver, said housing having exit and entrance ports through which the first light beam exits and enters the housing, respectively.

8. The arrangement according to claim 7, wherein the second transmitter means includes a second light source also mounted in the housing and operative for emitting the second light beam directly to the receiver.

9. The arrangement according to claim 1, wherein the first transmitter means includes a first light source and means in the first optical path for optically modifying the first light beam emitted by the first light source to have a generally thin, screen-like volume having height and width dimensions substantially larger than its thickness dimension substantially throughout the volume.

10. The arrangement according to claim 1, wherein the first transmitter means includes a plurality of light sources spaced apart of one another to emit a plurality of first light beams each extending across the area.

11. The arrangement according to claim 1, wherein the control processor means includes pulsing means for alternately pulsing the first and second transmitter means to transmit first and second light beam pulses, respectively; and wherein the common receiver means receives the first and second light beam pulses and respectively generates first and second pulsed signals having first and second pulse widths; and wherein the control processor means generates the differential measurement value by determining the difference between the first and second pulse widths.

12. The arrangement according to claim 11, wherein the pulsing means is operative over a plurality of cycles in which the first and second transmitter means are pulsed, and wherein the control processor means includes means for averaging the first pulse widths over the plurality of cycles to obtain an average first pulse width, and means for averaging the second pulse widths over the plurality of cycles to obtain an average second pulse width; and wherein the control processor means generates the differential measurement value by determining the difference between the average first and second pulse widths.

13. The arrangement according to claim 11, wherein the control processor means establishes the reference value during a calibration mode in which the area is free of the object by generating the reference value as a difference between the first and second signals, thereby rendering the reference value also resistant to the environmental variations.

14. The arrangement according to claim 11, wherein the control processor means includes means for setting the margin value as a predetermined value greater than zero.

15. The arrangement according to claim 11, wherein the control processor means includes means for adjustably setting the margin value as a function of the first signal.

16. The arrangement according to claim 14, wherein the control processor means generates the control signal during an operational mode subsequent to the calibration mode when the differential measurement value exceeds the reference value by said margin value.

17. The arrangement according to claim 11, wherein the control processor means is operative, during a setup mode, for controlling the second transmitter means to transmit the second light beam with an intensity sufficient to minimize the difference between the first and second signals.

18. The arrangement according to claim 17, wherein the second transmitter means includes a voltage-powered light source, and wherein the control processor means changes a supply voltage supplied to the light source.

19. The arrangement according to claim 1; and further comprising an indicator; and wherein the control processor means is operative, during an install mode, for controlling the first transmitter means to transmit the first light beam with an intensity sufficient to cause the first signal to be received by the common receiver means, and for causing the indicator to indicate when optical alignment is achieved between the first transmitter means and the common receiver means.

20. The arrangement according to claim 1, wherein the control processor means includes means for comparing the first digital signal to a predetermined range of values, and for generating a fail-safe signal to deactivate the arrangement when the first digital signal is outside said range.

21. An arrangement for detecting an object in an entranceway subject to environmental variations and bounded by upright walls, comprising:

a) a first transmitter means for transmitting a first light beam along a first optical path extending between the upright walls across the entranceway;

b) a second transmitter means for transmitting a second light beam along a second optical path remote from the entranceway;

c) a common receiver means subject to the environmental variations and situated in both the first and second optical paths for receiving the first and second light beams, and for respectively generating first and second digital signals that are both changeable by exposure to the environmental variations; and d) control processor means for establishing a reference value for generating an environmental variation-resistant, differential measurement value corresponding to a difference between the first and second digital signals, and for generating a control signal indicative of the status of the object in the entranceway when the differential measurement value differs from the reference value by a margin value.

22. The arrangement according to claim 21; and further comprising common support means for supporting the first transmitter means, the second transmitter means and the common receiver means at one of the upright walls, and retroreflective means situated at another of the upright walls opposite to said one wall in the first optical path for reflecting the first light beam emitted from the common support means back toward the same.

23. The arrangement according to claim 22, wherein the first transmitter means includes a first light source and means in the first optical path for optically modifying the first light beam emitted by the first light source to have a generally collimated configuration during transmission across the entranceway, and wherein the common receiver means includes a receiver having a field of view and means in the first optical path for optically modifying the field of view to focus the generally collimated first light beam onto the receiver.

24. The arrangement according to claim 23, wherein the common support means includes a housing having exit and entrance ports through which the first light beam exits and enters the housing, respectively.

25. The arrangement according to claim 24, wherein the second transmitter means includes a second light source also mounted in the housing and operative for emitting the second light beam directly to the receiver.

26. The arrangement according to claim 21, wherein the control processor means includes pulsing means for alternately pulsing the first and second transmitter means to transmit first and second light beam pulses, respectively; and wherein the common receiver means receives the first and second light beam pulses and respectively generates first and second pulsed signals having first and second pulse widths; and wherein the control processor means generates the differential measurement value by determining the difference between the first and second pulse widths.

27. The arrangement according to claim 26, wherein the pulsing means is operative over a plurality of cycles in which the first and second transmitter means are pulsed, and wherein the control processor means includes means for averaging the first pulse widths over the plurality of cycles to obtain an average first pulse width, and means for averaging the second pulse widths over the plurality of cycles to obtain an average second pulse width; and wherein the control processor means generates the differential measurement value by determining the difference between the average first and second pulse widths.

28. The arrangement according to claim 26, wherein the control processor means establishes the reference value during a calibration mode in which the entranceway is free of the object by generating the reference value as a difference between the first and second signals, thereby rendering the reference value also resistant to environmental variations.

29. The arrangement according to claim 28, wherein the control processor means includes means for setting the margin value as a predetermined value greater than zero.

30. The arrangement according to claim 28, wherein the control processor means includes means for adjustably setting the margin value as a function of the first signal.

31. The arrangement according to claim 29, wherein the control processor means generates the control signal during an operational mode subsequent to the calibration mode when the differential measurement value exceeds the reference value by said margin value.

32. The arrangement according to claim 26, wherein the control processor means is operative, during a setup mode, for controlling the second transmitter means to transmit the second light beam with an intensity sufficient to minimize the difference between the first and second signals.

33. The arrangement according to claim 32, wherein the second transmitter means includes a voltage-powered light source, and wherein the control processor means changes a supply voltage supplied to the light source.

34. The arrangement according to claim 21; and further comprising an indicator; and wherein the control processor means is operative, during an install mode, for controlling the first transmitter means to transmit the first light beam with an intensity sufficient to cause the first signal to be received by the common receiver means, and for causing the indicator to indicate when optical alignment is achieved between the first transmitter means and the common receiver means.

35. A method of detecting an object in an area subject to environmental variations, comprising the steps of:

a) transmitting a first light beam along a first optical path extending across the area;

b) transmitting a second light beam along a second optical path remote from the area;

c) receiving the first and second light beams, and respectively generating first and second digital signals that are both changeable by exposure to the environmental variations;

d) establishing a reference value;

e) generating an environmental variation-resistant, differential measurement value corresponding to a difference between the first and second digital signals; and f) generating a control signal indicative of the status of the object in the area when the differential measurement value differs from the reference value by a margin value wherein the transmitting steps a) and b) are alternately performed and pulsed to transmit first and second light beam pulses, respectively; and wherein step c) is performed by receiving the first and second light beam pulses and respectively generating first and second pulsed signals having first and second pulse widths; and wherein step e) is performed by determining the difference between the first and second pulse widths.

36. The method according to claim 35, wherein the transmitting steps a) and b) are performed over a plurality of cycles; and further comprising the steps of averaging the first pulse widths over the plurality of cycles to obtain an average first pulse width, and averaging the second pulse widths over the plurality of cycles to obtain an average second pulse width; and wherein step e) is performed by determining the difference between the average first and second pulse widths.

37. The method according to claim 35, wherein step d) is performed during a calibration mode in which the area is free of the object by generating the reference value as a difference between the first and second signals, thereby rendering the reference value also resistant to environmental variations.

38. The method according to claim 37; and further comprising the step of setting the margin value as a predetermined value greater than zero.

39. The method according to claim 37; and further comprising the step of adjustably setting the margin value as a function of the first signal.

40. The method according to claim 37, wherein step f) is performed during an operational mode subsequent to the calibration mode when the differential measurement value exceeds the reference value by said margin value.

41. The method according to claim 35; and further comprising the step of controlling, during a setup mode, the intensity of the second light beam to minimize the difference between the first and second signals.

42. The method according to claim 35; and further comprising the step of indicating alignment of the first light beam during an install mode.

43. An arrangement for detecting an object in an area subject to environmental variations, comprising:

a) transmitter means for transmitting a light beam along an optical path extending across the area during a first time period;

b) receiver means for detecting the light beam during the first time period and responsively generating a first digital signal having a first pulse width indicative of the detected light beam and the environmental variation, and for detecting the environmental variation during a second time period, subsequent to said first time period, and responsively generating a second digital signal having a second pulse width indicative of the environmental variation; and c) control processor means for establishing a reference value, for generating an environmental variation-resistant, differential measurement value corresponding to a difference between the first and second pulse widths of the first and second digital signals, and for generating a control signal indicative of the status of the object in the area when the differential measurement value differs form the reference value by a margin value.

* * * * *